United States Patent
Agiwal et al.

(10) Patent No.: US 10,257,698 B2
(45) Date of Patent: Apr. 9, 2019

(54) METHOD AND APPARATUS FOR MANAGING SECURITY KEY IN A NEAR FIELD D2D COMMUNICATION SYSTEM

(71) Applicant: Samsung Electronics Co., Ltd, Gyeonggi-do (KR)

(72) Inventors: Anil Agiwal, Bangalore (IN); Rajavelsamy Rajadurai, Bangalore (IN); Young-Bin Chang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 15/036,789

(22) PCT Filed: Nov. 14, 2014

(86) PCT No.: PCT/KR2014/010979
§ 371 (c)(1),
(2) Date: May 13, 2016

(87) PCT Pub. No.: WO2015/072788
PCT Pub. Date: May 21, 2015

(65) Prior Publication Data
US 2016/0295406 A1    Oct. 6, 2016

(30) Foreign Application Priority Data

Nov. 14, 2013 (IN) .......................... 1298/KOL/2013

(51) Int. Cl.
*H04L 29/06* (2006.01)
*H04W 12/04* (2009.01)
(Continued)

(52) U.S. Cl.
CPC ........... *H04W 12/04* (2013.01); *H04W 76/23* (2018.02); *H04W 76/14* (2018.02)

(58) Field of Classification Search
None
See application file for complete search history.

(56) References Cited

U.S. PATENT DOCUMENTS

| 8,839,373 B2 * | 9/2014 | Palanigounder ....... H04B 7/155 455/7 |
| 2008/0273704 A1 * | 11/2008 | Norrman ............... H04L 63/062 380/278 |

(Continued)

FOREIGN PATENT DOCUMENTS

| WO | WO 2013/095001 A1 | 6/2013 |
| WO | WO 2013/165695 A1 | 11/2013 |

OTHER PUBLICATIONS

Dahshan, Hisham; Irvine, James. Key Management in Web Trust for Mobile Ad Hoc Networks. 2009 International Conference on Advanced Information Networking and Applications. https://ieeexplore.ieee.org/stamp/stamp.jsp?tp=&arnumber=5076222 (Year: 2009).*

(Continued)

*Primary Examiner* — Jeremiah L Avery

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present disclosure further relates to a method and apparatus for managing a security key in a communication system are provided. The method includes transmitting a first key request message including an identifier (ID) of an originating user equipment (UE) to a server through a mobility management entity (MME), receiving a key response message including security parameters and a secret key of the originating UE from the server, determining a security key based on the security parameters and the secret key of the originating UE by the originating UE, and communicating with a terminating UE based on the security key by the (Continued)

originating UE, while a connection between the originating UE and the terminating UE is maintained.

20 Claims, 11 Drawing Sheets

(51) Int. Cl.
*H04W 76/23* (2018.01)
*H04W 76/14* (2018.01)

(56) References Cited

U.S. PATENT DOCUMENTS

| | | | |
|---|---|---|---|
| 2010/0255869 A1 | 10/2010 | Sood | |
| 2011/0041003 A1* | 2/2011 | Pattar | H04W 12/10 714/4.3 |
| 2011/0067095 A1* | 3/2011 | Leicher | H04L 63/06 726/10 |
| 2011/0216743 A1* | 9/2011 | Bachmann | H04L 63/164 370/331 |
| 2011/0302638 A1* | 12/2011 | Cha | G06F 21/57 726/6 |
| 2011/0314287 A1* | 12/2011 | Escott | H04L 63/061 713/171 |
| 2012/0311335 A1* | 12/2012 | Fransen | H04L 63/06 713/170 |
| 2013/0022199 A1 | 1/2013 | Kim et al. | |
| 2013/0066772 A1* | 3/2013 | Xiong | G06F 21/32 705/39 |
| 2013/0170643 A1* | 7/2013 | Xiao | H04L 63/08 380/270 |
| 2014/0053241 A1* | 2/2014 | Norrman | H04L 63/08 726/3 |
| 2015/0087233 A1 | 3/2015 | Kim et al. | |

OTHER PUBLICATIONS

Eissa, Tameem et al. Enhancing MANET Security using Secret Public Keys. 2009 International Conference on Future Networks. https://ieeexplore.ieee.org/stamp/stamp.jsp?tp=&arnumber=5189914 (Year: 2009).*

Xiong, Wan An et al. Identity-based and secret share ECC key management scheme for MANET. 4th International Conference on New Trends in Information Science and Service Science. https://ieeexplore.ieee.org/stamp/stamp.jsp?tp=&arnumber=5488638 (Year: 2010).*

Yujun, Zhu et al. Secret Key Management Based on Variable Authentication Code in UPT system. ICCT'98. Proceedings of 1998 International Conference on Communication Technology. https://ieeexplore.ieee.org/stamp/stamp.jsp?tp=&arnumber=743404 (Year : 1998).*

International Search Report dated Feb. 5, 2015 in connection with International Application No. PCT/KR2014/010979; 3 pages.

* cited by examiner

[Fig. 1]
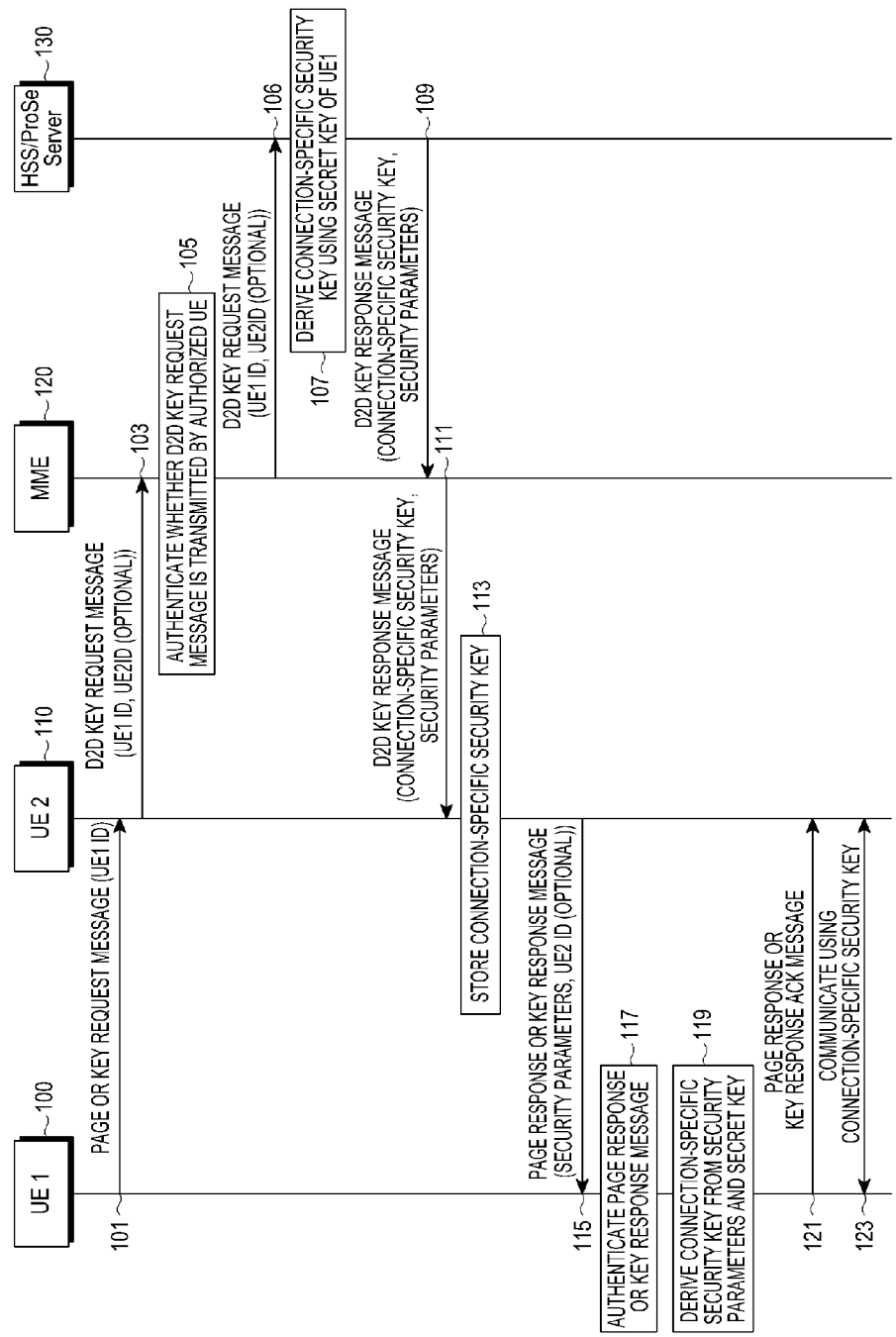

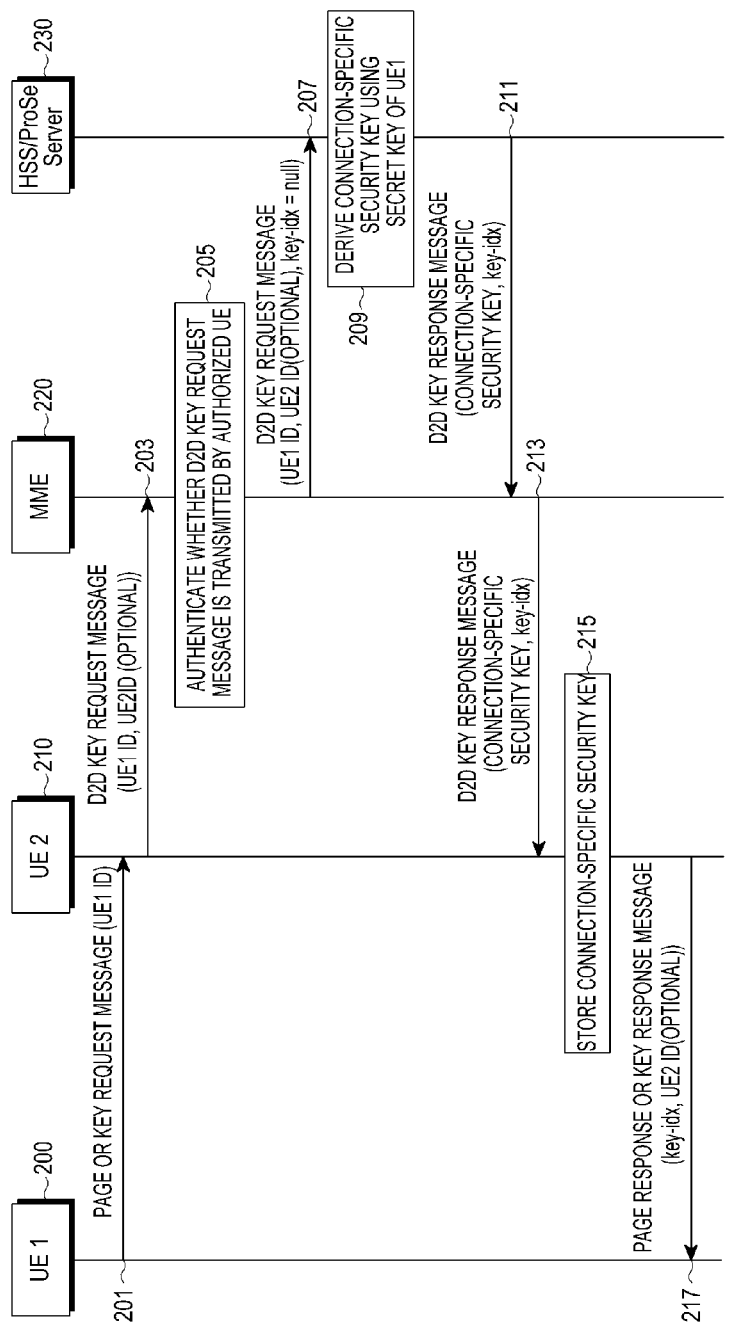

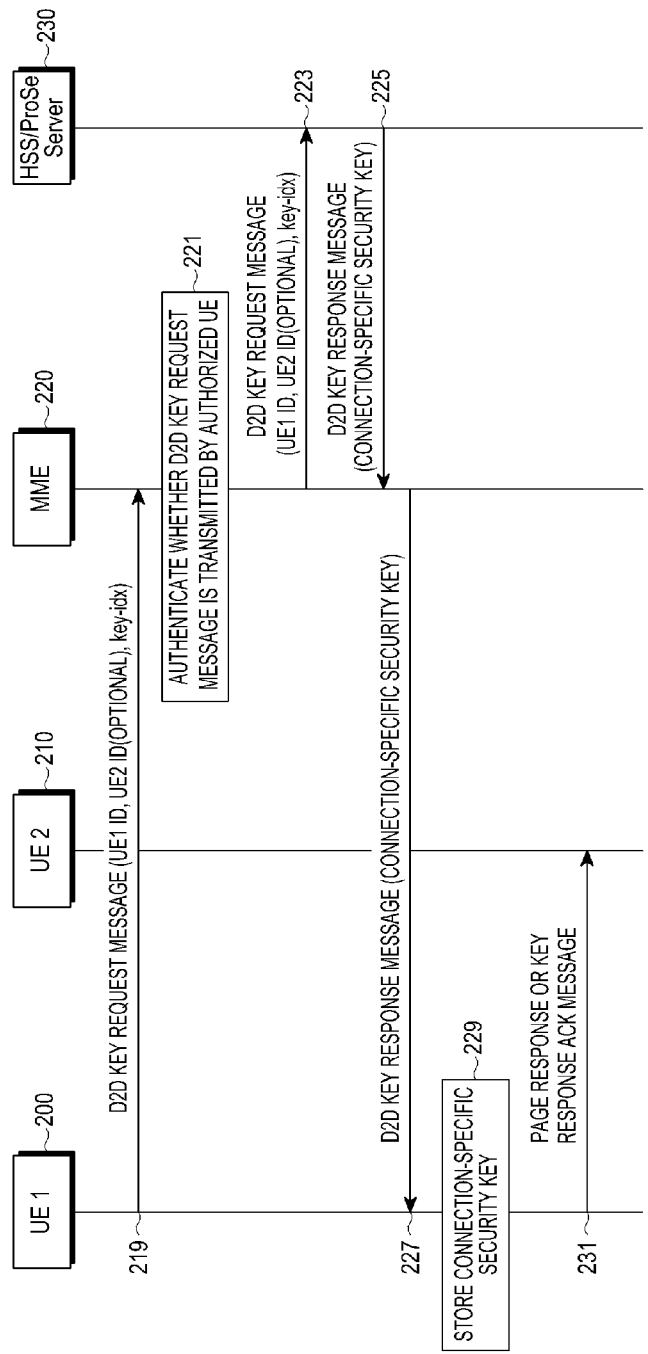

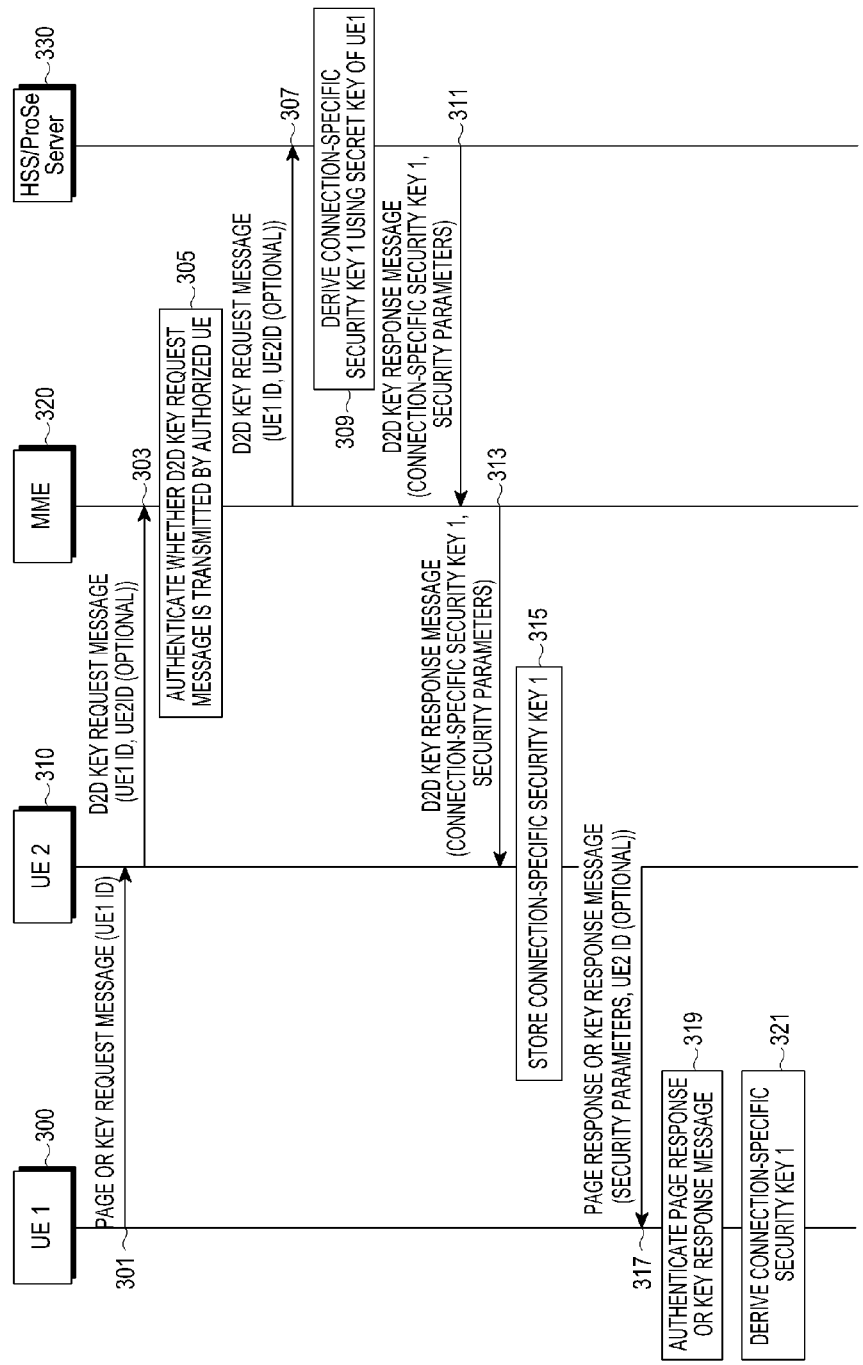
[Fig. 3a]

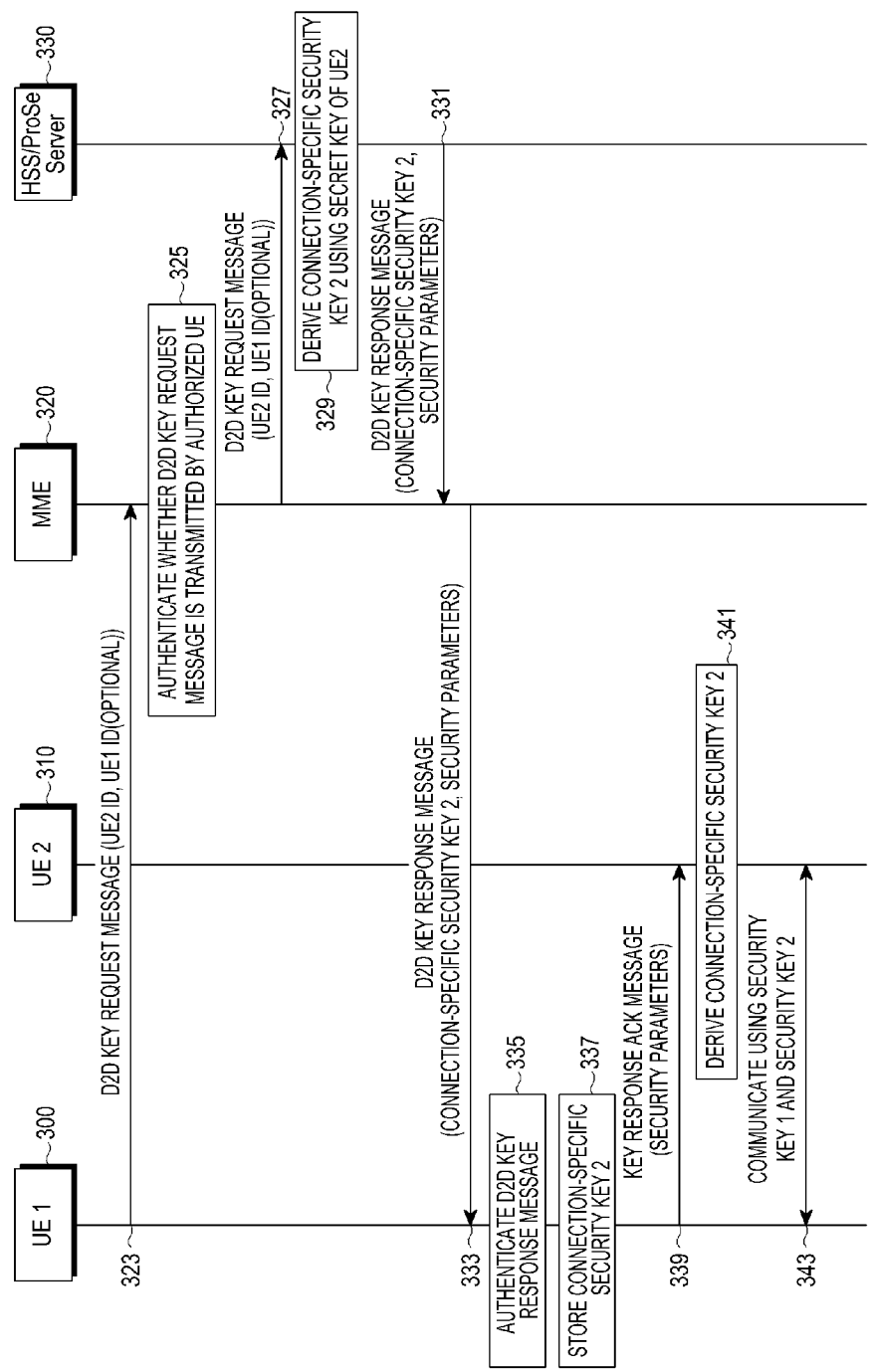
[Fig. 3b]

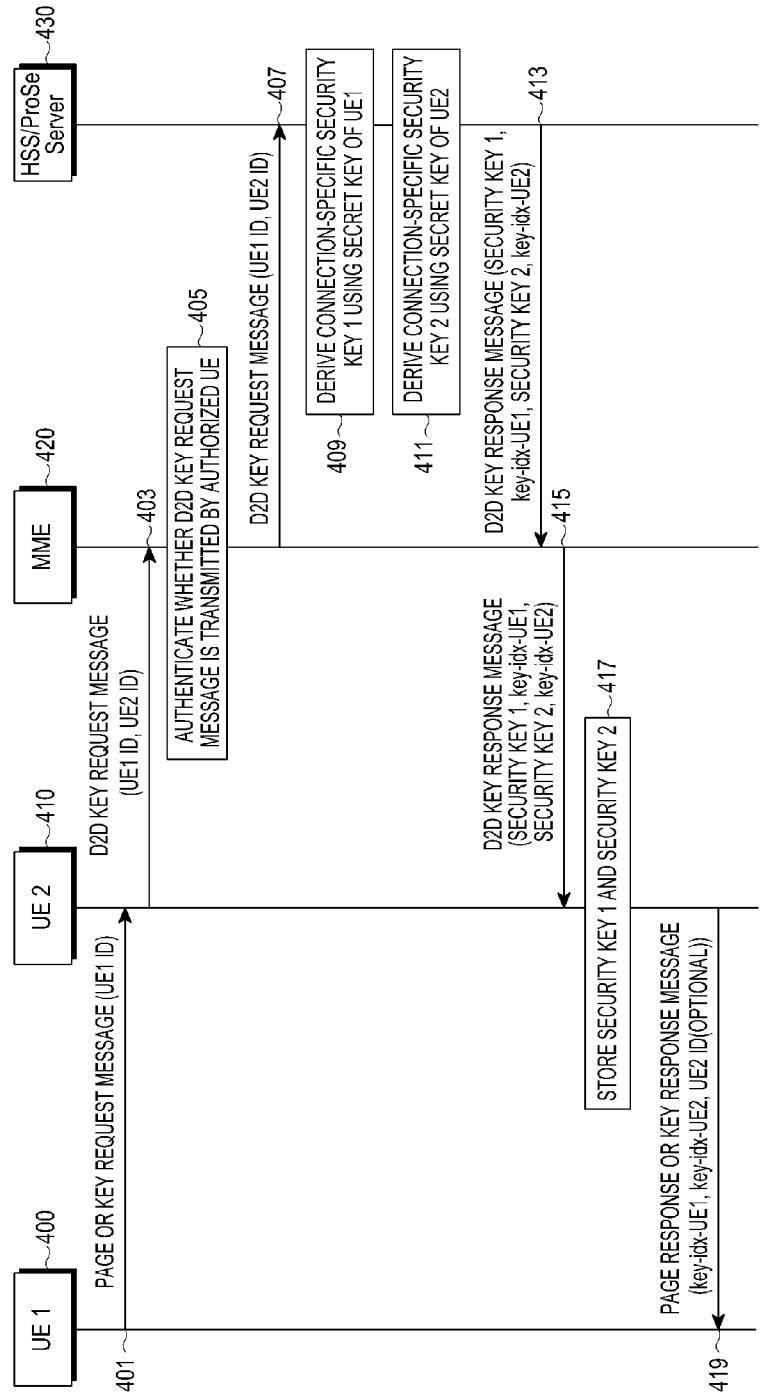
[Fig. 4a]

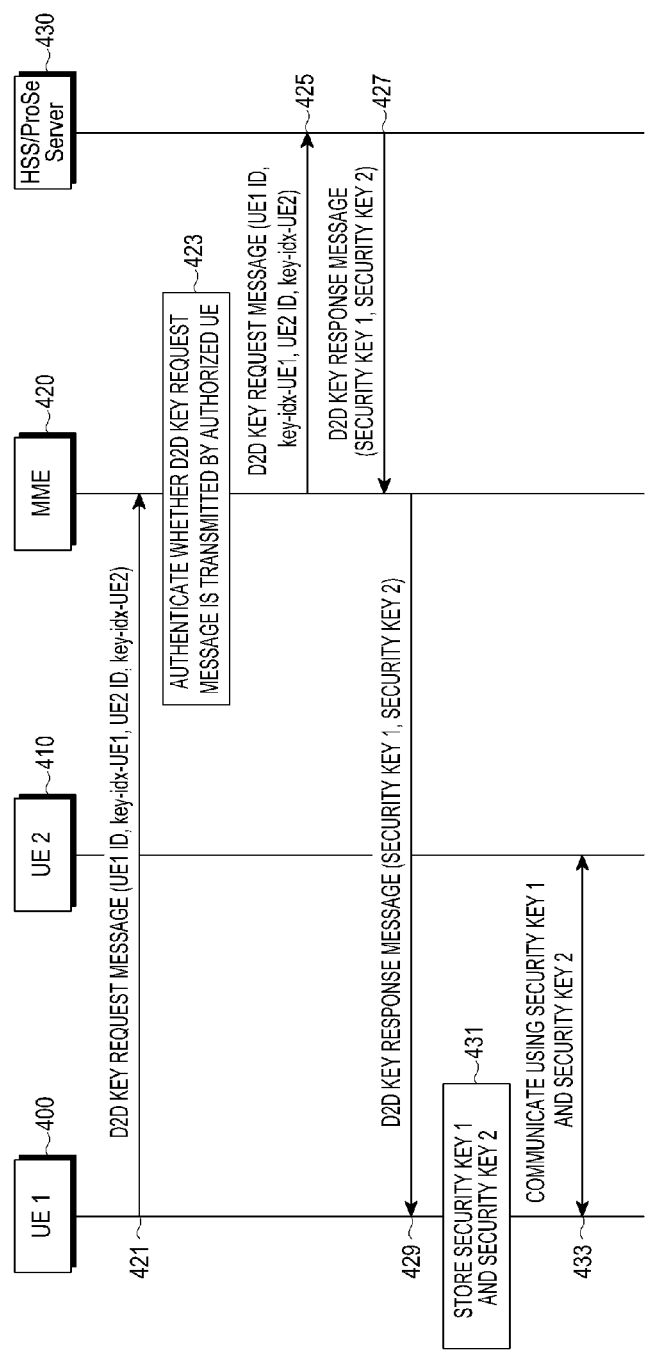
[Fig. 4b]

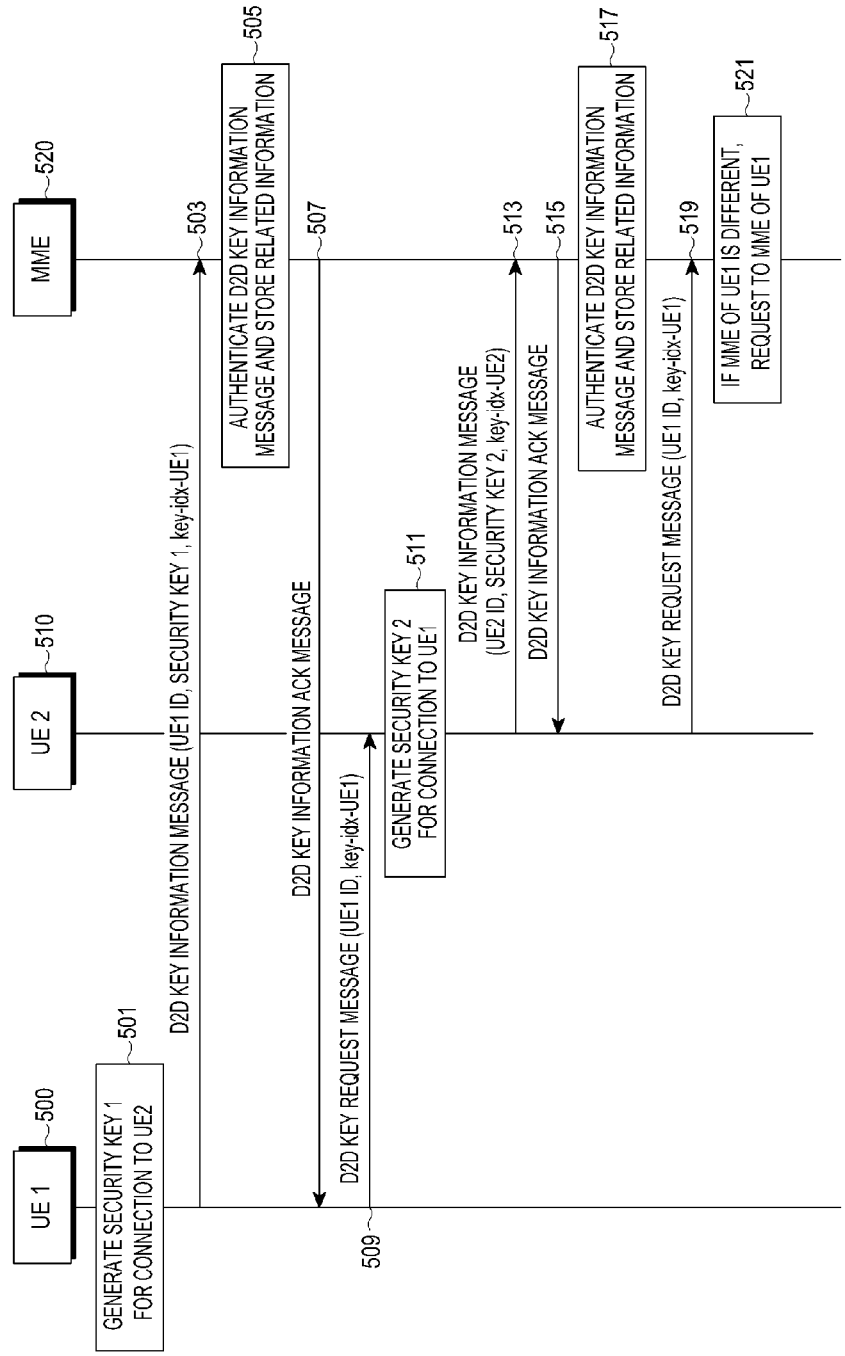
[Fig. 5a]

[Fig. 5b]
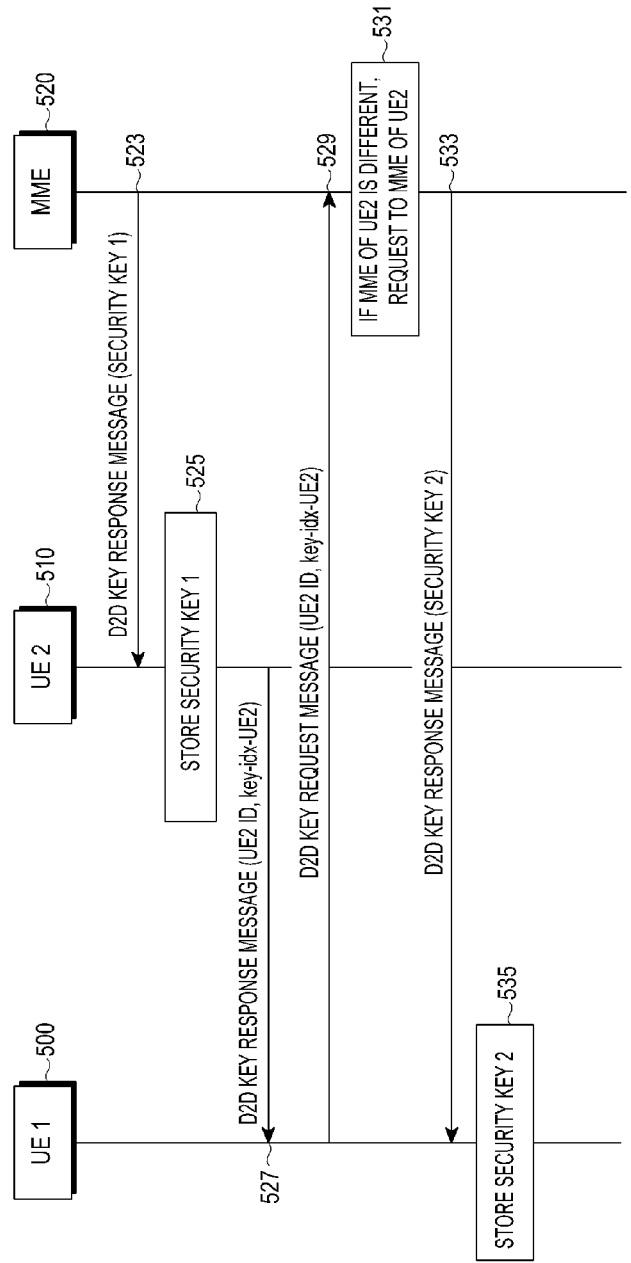

[Fig. 6]
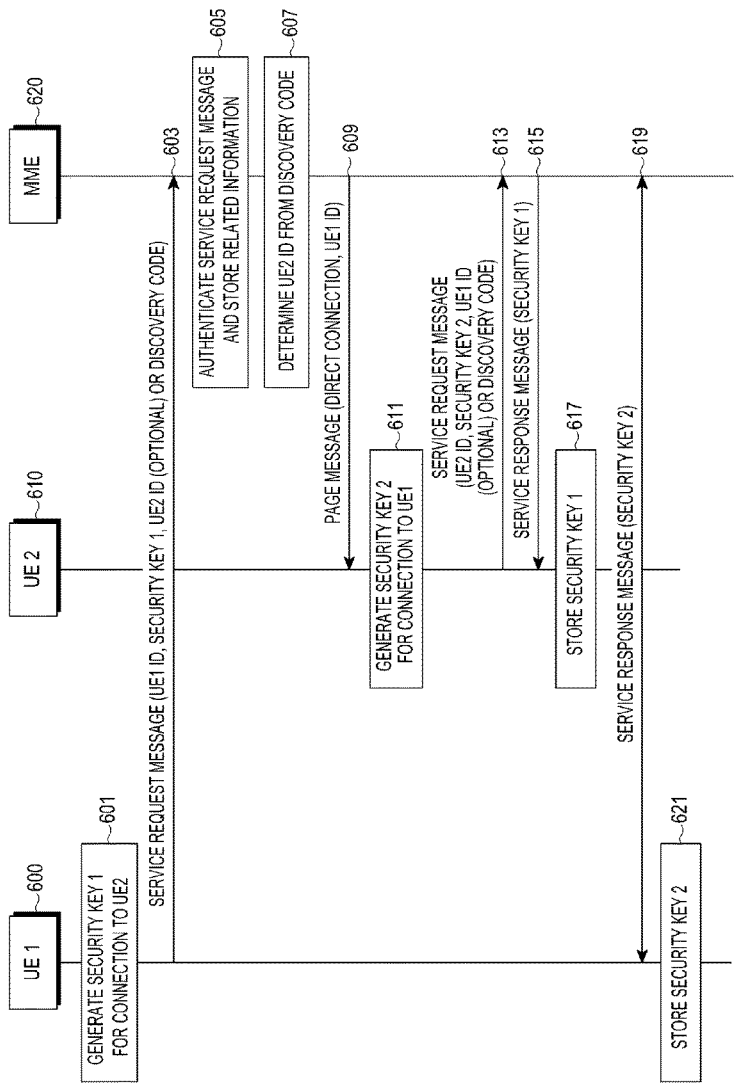
[Fig. 7]
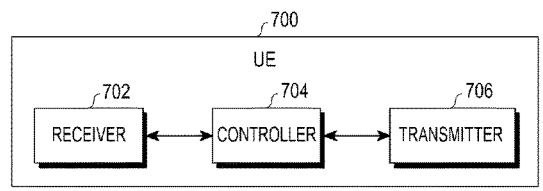
[Fig. 8]
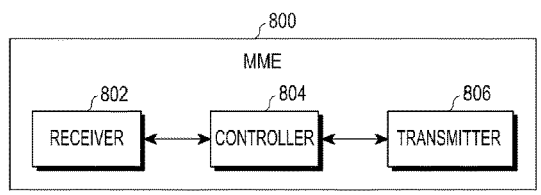

[Fig. 9]
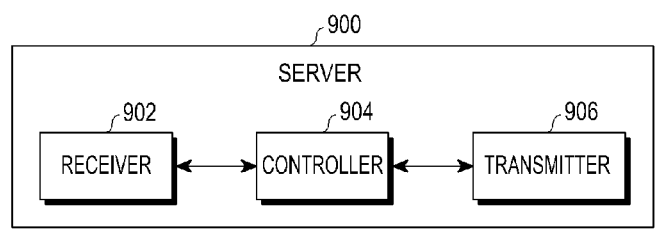

METHOD AND APPARATUS FOR MANAGING SECURITY KEY IN A NEAR FIELD D2D COMMUNICATION SYSTEM

PRIORITY

This application is a National Phase Entry of PCT International Application No. PCT/KR2014/010979, which was filed on Nov. 14, 2014, and claims a priority to Indian Patent Application No. 1298/KOL/2013, which was filed on Nov. 14, 2013, the contents of which are incorporated herein by reference.

TECHNICAL FIELD

The present invention relates to a method and apparatus for performing Device-to-Device (D2D) communication in a D2D Communication system.

BACKGROUND

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, a main function of a User Equipment (UE) in a D2D communication system is to participate in direct one-to-one communication with another UE via a radio interface. However, a passive attacker may intercept data packets during exchange of the data packets between the UEs. In this case, the passive attacker may acquire the original contents of the exchanged data packets. On the other hand, an active attacker may modify the exchanged data packets without being noticed by either of the UEs.

Accordingly, there is a need for ciphering, replay protection, and integrity protection for D2D communication. To enable such a secure communication, security keys are needed.

SUMMARY

It is therefore an object of the invention is to propose disclosure devised to solve the problem a method and apparatus for managing and establishing security key(s) in a D2D communication system.

Another object of the invention is to propose a method and apparatus for generating security keys and exchanging the security keys between User Equipments (UEs) in D2D communication system.

In an aspect of the present disclosure, there is provided a method for managing a security key in a Device-to-Device (D2D) communication system, the method comprising transmitting a key request message including an Identifier (ID) of an originating User Equipment (UE) to a server through a Mobility Management Entity (MME) by the originating UE, receiving a key response message including security parameters from among the security parameters and a security key transmitted by the server by the originating UE, the security key being derived using a secret key of the originating UE, deriving the security key using the security parameters and the secret key of the originating UE by the originating UE, and communicating with a terminating UE using the security key by the originating UE, while a connection between the originating UE and the terminating UE is maintained.

In another aspect of the present disclosure, there is provided a method for managing a security key in a D2D communication system, the method comprising the steps of transmitting a key request message including an ID of a transmitting UE to a server through an MME by the transmitting UE, receiving a key response message including security parameters from among the security parameters and a first security key transmitted by the server by the transmitting UE, the first security key being derived using a secret key of the transmitting UE, deriving the first security key using the security parameters and the secret key of the transmitting UE by the transmitting UE, transmitting a first D2D key request message including an ID of a receiving UE through the MME by the transmitting UE, receiving a first D2D key response message including the security parameters and a second security key transmitted by the server by the transmitting UE, the second security key being derived using a secret key of the receiving key, and communicating with the receiving UE using the first and second security keys by the transmitting UE, while a connection between the transmitting UE and the receiving UE is maintained.

In still another aspect of the present disclosure, there is provided a method for managing a security key in a D2D communication system, the method comprising generating a first security key for a connection to a receiving UE and transmitting a key information message including an ID of a transmitting UE, the first security key, and a first key index for the transmitting UE to a server through an MME by the transmitting UE, transmitting a first key request message including the ID of the transmitting UE and the first key index to the receiving UE by the transmitting UE, if the MME authenticates the key information message, receiving a first key response message including an ID of the receiving UE and a second key index for the receiving UE from the receiving UE and transmitting a second key request message including the ID of the receiving UE and the second key index to the MME by the transmitting UE, receiving a second key response message including a second security key derived using a secret key of the receiving UE from the MME by the transmitting UE, and communicating with the receiving UE using the first and second security keys by the transmitting UE, while the connection between the transmitting UE and the receiving UE is maintained.

In yet another aspect of the present disclosure, there is provided a method for managing a security key in a D2D communication system, the method comprising transmitting a D2D key request message including an ID of an originating UE to a server through an MME by a terminating UE, receiving a D2D key response message including security parameters and a security key transmitted by the server by the terminating UE, the security key being derived using a secret key of the originating UE, transmitting a key response message including the security parameters to the originating UE by the terminating UE, and communicating with the originating UE using the security key by the terminating UE, while a connection between the originating UE and the terminating UE is maintained.

In a further aspect of the present disclosure, there is provided a method for managing a security key in a D2D communication system, comprising transmitting a D2D key request message including an ID of a transmitting UE to a server through an MME by a receiving UE, receiving a D2D key response message including security parameters and a first security key transmitted by the server by the receiving UE, the first security key being derived using a secret key of the transmitting UE, transmitting a key response message including the security parameters to the transmitting UE by the receiving UE, deriving a second security key using the security parameters included in a key response ACKnowledgment (ACK) message received from the transmitting UE and a secret key of the receiving UE by the receiving UE, and communicating with the transmitting UE using the first and second security keys by the receiving UE, while a connection between the transmitting UE and the receiving UE is maintained.

In a still further aspect of the present disclosure, there is provided a method for managing a security key in a D2D communication system, comprising receiving a key request message including an ID of a transmitting UE and a first key index for the transmitting UE from the transmitting UE by a receiving UE, if the transmitting UE generates a first security key for a connection to the receiving UE, generating a second security key for the connection to the transmitting UE and transmitting the key request message including the ID of the transmitting UE and the first key index to an MME by the receiving UE, receiving a key response message including the first security key from the MME by the receiving UE, transmitting a key response message including an ID of the receiving UE and a second key index for the receiving UE to the transmitting UE by the receiving UE, and communicating with the transmitting UE using the first and second security keys by receiving UE, while the connection between the transmitting UE and the receiving UE is maintained.

In another aspect of the present disclosure, an originating UE for managing a security key in a D2D communication system includes a transmitter for transmitting a key request message including an ID of the originating UE to a server through an MME, a receiver for receiving a key response message including security parameters from among the security parameters and a security key transmitted by the server, the security key being derived using a secret key of the originating UE, and a controller for deriving the security key using the security parameters and the secret key of the originating UE. The transmitter and the receiver communicate with a terminating UE using the security key by the originating UE, while a connection between the originating UE and the terminating UE is maintained.

In another aspect of the present disclosure, a transmitting UE for managing a security key in a D2D communication system includes a transmitter for transmitting a key request message including an ID of the transmitting UE to a server through an MME and transmitting a first D2D key request message including an ID of a receiving UE through the MME, a receiver for receiving a key response message including security parameters from among the security parameters and a first security key transmitted by the server, the first security key being derived using a secret key of the transmitting UE and receiving a first D2D key response message including the security parameters and a second security key transmitted by the server, the second security key being derived using a secret key of the receiving key, and a controller for deriving the first security key using the security parameters and the secret key of the transmitting UE. The transmitter and the receiver communicate with the receiving UE using the first and second security keys, while a connection between the transmitting UE and the receiving UE is maintained.

In another aspect of the present disclosure, a transmitting UE for managing a security key in a D2D communication system includes a controller for generating a first security key for a connection to a receiving UE, a transmitter for transmitting a key information message including an ID of a transmitting UE, the first security key, and a first key index for the transmitting UE to a server through an MME, and transmitting a first key request message including the ID of the transmitting UE and the first key index to the receiving UE, if the MME authenticates the key information message, and a receiver for receiving a first key response message including an ID of the receiving UE and a second key index for the receiving UE from the receiving UE and transmitting a second key request message including the ID of the receiving UE and the second key index to the MME and receiving a second key response message including a second security key derived using a secret key of the receiving UE from the MME. The transmitter and the receiver communicate with the receiving UE using the first and second security keys, while the connection between the transmitting UE and the receiving UE is maintained.

In another aspect of the present disclosure, a terminating UE for managing a security key in a D2D communication system includes a transmitter for transmitting a D2D key request message including an ID of an originating UE to a server through an MME and transmitting a key response message including the security parameters to the originating UE, and a receiver for receiving a D2D key response message including security parameters and a security key transmitted by the server, the security key being derived using a secret key of the originating UE. The transmitter and the receiver communicate with the originating UE using the security key, while a connection between the originating UE and the terminating UE is maintained.

In another aspect of the present disclosure, a receiving UE for managing a security key in a D2D communication system includes a transmitter for transmitting a D2D key request message including an ID of a transmitting UE to a server through an MME and transmitting a key response message including the security parameters to the transmitting UE, a receiver for receiving a D2D key response message including security parameters and a first security key derived using a secret key of the transmitting UE, and a controller for deriving a second security key using the security parameters included in a key response ACK message received from the transmitting UE and a secret key of the receiving UE. The transmitter and the receiver communicate with the transmitting UE using the first and second security keys by the receiving UE, while a connection between the transmitting UE and the receiving UE is maintained.

In another aspect of the present disclosure, a receiving UE for managing a security key in a D2D communication system includes a receiver for receiving a key request message including an ID of a transmitting UE and a first key index for the transmitting UE from the transmitting UE, if the transmitting UE generates a first security key for a connection to the receiving UE, and receiving a key response message including the first security key from an MME, and a transmitter for generating a second security key for the connection to the transmitting UE, transmitting the key request message including the ID of the transmitting UE and the first key index to the MME, and transmitting a key response message including an ID of the receiving UE and a second key index for the receiving UE to the transmitting UE. The transmitter and the receiver communicate with the transmitting UE using the first and second security keys, while the connection between the transmitting UE and the receiving UE is maintained.

Thus, the present invention provides a method for managing a security key in a D2D communication system. The method can increase the reliability of a security key and maximize security.

BRIEF DESCRIPTION OF THE DRAWINGS

FIG. 1 is a diagram illustrating a signal flow for an example of generating security keys and exchanging the security keys between User Equipments (UEs) in a Device-to-Device (D2D) communication system according to a first method of the present disclosure;

FIGS. 2a and 2b are diagrams illustrating a signal flow for another example of generating security keys and exchanging the security keys between UEs in a D2D communication system according to the first method of the present disclosure;

FIGS. 3a and 3b are diagrams illustrating a signal flow for an example of generating security keys and exchanging the security keys between UEs in a D2D communication system according to a second method of the present disclosure;

FIGS. 4a and 4b are diagrams illustrating a signal flow for another example of generating security keys and exchanging the security keys between UEs in a D2D communication system according to the second method of the present disclosure;

FIGS. 5a and 5b are diagrams illustrating a signal flow for an example of generating security keys and exchanging the security keys between UEs in a D2D communication system according to a third method of the present disclosure;

FIG. 6 is a diagram illustrating a signal flow for another example of generating security keys and exchanging the security keys between UEs in a D2D communication system according to the third method of the present disclosure;

FIG. 7 is a block diagram of a UE that manages a security key in a D2D communication system according to an embodiment of the present disclosure;

FIG. 8 is a block diagram of an MME that manages a security key in a D2D communication system according to an embodiment of the present disclosure; and FIG. 9 is a block diagram of a server that manages a security key in a D2D communication system according to an embodiment of the present disclosure.

DETAILED DESCRIPTION

Reference will be made to preferred embodiments of the present disclosure with reference to the attached drawings. A detailed description of a generally known function and structure of the present disclosure will be avoided lest it should obscure the subject matter of the present disclosure.

In addition, although the terms used in the present disclosure are defined in consideration of functions of the present disclosure, the terms may be changed according to the intention of a user or an operator, or customs. Therefore, the present disclosure must be understood, not simply by the actual terms used but by the meanings of each term lying within.

In a legacy communication system wherein a UE communicate with the base station, a User Equipment (UE) derives its key implicitly and a Base Station (BS) acquires a key specific to the UE from an authenticator.

On the other hand, although UEs may have their own master keys in a Device-to-Device (D2D) communication system, the following issues may be faced in terms of security key management.

Which key between a master key and a derived key should the UEs use?

How a security key is to be derived from a master key?

Which master key between the master keys of the UEs is to be used to derive security keys?

Is a single key required for each direction or both directions?

How are different keys to be exchanged, with security ensured?

Embodiments of the present disclosure provide first, second, and third methods to solve the problems involved in security management, which will be described below.

Method 1

One security key is used for both transmission of an originating UE and transmission of a terminating UE.

The security key for communication between the UEs is derived from a secret key of a UE. A security key is specific to one connection. That is, if a first UE (UE1) is connected to a second UE (UE2) and a third UE (UE3), different security keys are used for the connection between UE1 and UE2 and the connection between UE1 and UE3.

The lifetime of a security key is equal to the duration of a connection. In the case where UE1 is connected to UE2, upon release of the connection, a security key for the connection is also released. Upon re-setup of the connection, a new security key is generated, as follows.

Security Keyconnection=KDF(RAND,connection count of originating UE,secret key of originating UE).

RAND is generated for all new connections between the originating UE and other UEs and the connection count is increased for each new connection.

The originating UE internally derives a security key, while the terminating UE receives the security key from a network. Security parameters are generated and maintained in the network.

The first method will be described in greater detail in relation to signaling procedures illustrated in FIGS. 1, 2a, and 2b.

Method 2

Separate security keys are used for transmission of a transmitting UE and transmission of a receiving UE.

A security key for communication between UEs is derived from a secret key of a UE and is specific to a connection and/or a transmission direction.

The security key lasts as long as the connection is maintained. That is, if UE1 is connected to UE2, a security key is released upon release of the connection. Upon re-setup of the connection, a new security key is generated.

A connection-specific security key is generated using a secret key of a transmitting UE. That is, if UE1 is connected to UE2, a secret key of UE1 is used for transmission of UE1 and a secret key of UE2 is used for transmission of UE2. A security key is generated by the following equation.

Security Key$_{connection}$=KDF(RAND,connection count of transmitting UE,secret key of transmitting UE)

where RAND is generated for every new connection between the transmitting UE and other UEs and the connection count increases for each new connection.

The transmitting UE internally derives a security key, whereas the receiving UE receives a security key from a network. Security parameters are generated and maintained by the network.

Method 2 will be described later in greater detail in relation to signaling procedures illustrated in FIGS. 3a to 4b.

Method 3

Separate security keys are used for transmission of a transmitting UE and transmission of a receiving UE.

A security key for communication between UEs is derived from a secret key of a UE and is specific to a connection and/or a transmission direction.

The security key lasts as long as the connection is maintained. That is, if UE1 is connected to UE2, a security key is released upon release of the connection. Upon re-setup of the connection, a new security key is generated.

A connection-specific security key is generated using a secret key of a transmitting UE. That is, if UE1 is connected to UE2, a secret key of UE1 is used for transmission of UE1 and a secret key of UE2 is used for transmission of UE2. The security key is generated by the following equation.

Security Key$_{connection}$=KDF(RAND,connection count of transmitting UE,secret key of transmitting UE) where RAND is generated for every new connection between the transmitting UE and other UEs and the connection count increases for each new connection.

The transmitting UE internally derives a security key, whereas the receiving UE receives a security key from a network. Security parameters are generated and maintained by a UE.

Method 3 will be described later in greater detail in relation to signaling procedures illustrated in FIGS. 5a, 5b, and 6.

FIG. 1 is a diagram illustrating a signal flow for an example of generating security keys and exchanging the security keys between UEs in a D2D communication system according to a first method of the present disclosure.

Referring to FIG. 1, the D2D communication system includes UE1 100, UE2 110, a Mobility Management Entity (MME) 120, and a server such as a Home Subscriber Server (HSS)/Proximity Service (ProSe) server 130.

UE1 100 transmits a page or key request message to UE2 110 (operation 101). The page or key request message includes an Identifier (ID) of UE1 100, UE1 ID.

UE2 110 transmits a D2D key request message to the MME 120 (operation 103). The D2D key request message includes the ID of UE1 100 as a primary UE, that is, UE1 ID and an ID of UE2 110 as a secondary UE, that is, UE2 ID. Herein, UE2 ID is selectively included in the D2D key request message. That is, only when it is necessary to determine whether UE2 110 has been authorized and/or when UE2 ID is used in generating a security key, UE2 ID is included in the D2D key request message. Non-Access Stratum (NAS) security is applied to the D2D key request message.

The MME 120 authenticates/validates whether the D2D key request message received in operation 103 has been transmitted by an authorized UE (operation 105) and transmits a D2D key request message to the HSS/ProSe server 130 (operation 106) if authentication/validation is successful. The D2D key request message includes the ID of UE1 100 as a primary UE, that is, UE1 ID and the ID of UE2 110 as a secondary UE, that is, UE2 ID. Herein, UE2 ID is selectively included in the D2D key request message. That is, only when it is necessary to determine whether UE2 110 has been authorized and/or when UE2 ID is used in generating a security key, UE2 ID is included in the D2D key request message.

The HSS/ProSe server 130 derives a connection-specific security key using a secret key of primary UE i.e. UE1 (operation 107) and transmits a D2D key response message for the D2D key request message received in operation 106 to the MME 120 (operation 109). The HSS/ProSe server 130 maintains connection counter for each UE. The D2D key response message includes the connection-specific security key and security parameters. The connection-specific security key may be, for example, K'-D2D-UE1 and the security parameters may include, for example, a RAND function, a connection count, and a Message Authentication Code (MAC).

The MME 120 transmits a D2D key response message for the D2D key request message received in operation 103 to UE2 110 (operation 111). The D2D key response message includes the connection-specific security key and the security parameters. NAS security is applied to the D2D key response message.

UE2 110 stores the connection-specific security key received in operation 111 (operation 113). Then UE2 110 transmits a page or key response message for the page or key request message received in operation 101 to UE1 100 (operation 115). The page or key response message includes the security parameters and UE2 ID. UE2 ID is selectively included in the page or key response message. That is, when UE2 ID is used in generating a security key and is not available to UE1 100, UE2 ID is included in the page or key response message. UE1 100 may indicate whether UE2 ID is known to UE1 100 by a key request message at operation 101.

UE1 100 authenticates the page or key response message received in operation 115 (operation 117) and derives the connection-specific security key from the security parameters (i.e. connection counter, RAND) included in the authenticated page or key response message and the secret key of UE1 100 (operation 119). Authentication is done using the MAC. UE1 100 generates MAC and compares with the received MAC. UE1 100 transmits a page or key response Acknowledgement (ACK) message to UE2 110 (operation 121). Subsequently, UE1 100 communicates with UE2 110 using the connection-specific security key (operation 123). The connection-specific security key lasts for the duration of the connection.

Particularly, the connection-specific security key and the MAC are generated using the secret key of UE1 100, the RAND function, and the connection count of UE1 100. In an alternate embodiment, the ID of UE2, UE2 ID may also be used additionally in generation of connection-specific security key. In an another alternate embodiment, the ID of UE2, UE2 ID and the ID of UE1, UE 1 ID both may also be used additionally in generation of connection-specific security key.

The secret key of UE1 100 is known only to UE1 100 and the HSS/ProSe server 130. The secret key of a specific UE is not provided to another UE and a key derived from the secret key is not transmitted wirelessly.

With reference to FIG. 1, a method for generating security keys and exchanging the security keys between UEs when a primary UE is UE1 and a secondary UE is UE2 has been described, by way of example. If both UE1 ID and UE2 ID are used in generating a security key, the primary UE and the secondary UE may be exchanged in the signaling procedure illustrated in FIG. 1.

FIGS. 2a and 2b are diagrams illustrating a signal flow for another example of generating security keys and exchanging the security keys between UEs in a D2D communication system according to the first method of the present disclosure.

Compared to the signaling procedure of FIG. 1, a key index (key-idx or key index) is used in the signaling procedure of FIGS. 2a and 2b. The use of a key index may reduce the overhead of a page response message.

Referring to FIGS. 2a and 2b, the D2D communication system includes UE1 200, UE2 210, an MME 220, and a server, for example, an HSS/ProSe server 230.

UE1 200 transmits a page or key request message to UE2 110 (operation 201). The page or key request message includes an ID of UE1 200, UE1 ID.

UE2 210 transmits a D2D key request message to the MME 220 (operation 203). The D2D key request message includes the ID of UE1 200 as a primary UE, that is, UE1 ID and an ID of UE2 210 as a secondary UE, that is, UE2 ID. Herein, UE2 ID is selectively included in the D2D key request message. That is, only when it is necessary to determine whether UE2 210 has been authorized and/or when UE2 ID is used in generating a security key, UE2 ID is included in the D2D key request message. NAS security is applied to the D2D key request message.

The MME 220 authenticates/validates whether the D2D key request message has been transmitted by an authorized UE (operation 205) and transmits a D2D key request message to the HSS/ProSe server 230 (operation 207) if the authentication/validation is successful. The D2D key request message includes the ID of UE1 200 as a primary UE, that is, UE1 ID, the ID of UE2 210 as a secondary UE, that is, UE2 ID, and key-idx. Herein, UE2 ID is selectively included in the D2D key request message. That is, only when it is necessary to determine whether UE2 110 has been authorized and/or when UE2 ID is used in generating a security key, UE2 ID is included in the D2D key request message. Key-idx is set to a null value.

The HSS/ProSe server 230 derives a connection-specific security key using a secret key of UE1 (operation 209) and transmits a D2D key response message for the D2D key request message received in operation 207 to the MME 120 (operation 211). The D2D key response message includes the connection-specific security key and key-idx.

The MME 220 transmits a D2D key response message for the D2D key request message received in operation 203 to UE2 210 (operation 213). The D2D key response message includes the connection-specific security key and key-idx. NAS security is applied to the D2D key response message.

UE2 210 stores the connection-specific security key received in operation 213 (operation 215). Then UE2 210 transmits a page or key response message for the page or key request message received in operation 201 to UE1 100 (operation 217). The page or key response message includes key-idx and UE2 ID. UE2 ID is selectively included in the page or key response message. That is, when UE2 ID is used in generating a security key and is not available to UE1 200, UE2 ID is included in the page or key response message. UE1 200 may indicate whether UE2 ID is known to UE1 200 by a key response message at operation 201.

UE1 200 transmits a D2D key request message to the MME 220 (operation 219). The D2D key request message includes the ID of UE1 100 as a primary UE, that is, UE1 ID, the ID of UE2 110 as a secondary UE, that is, UE2 ID. Herein, UE2 ID is selectively included in the D2D key request message. That is, only when it is necessary to determine whether UE2 210 has been authorized and/or when UE2 ID is used in generating a security key, UE2 ID is included in the D2D key request message. NAS security is applied to the D2D key request message.

The MME 220 authenticates whether the D2D key request message received in operation 219 has been transmitted by an authorized UE (operation 221) and transmits a D2D key request message to the HSS/ProSe server 230 (operation 223). The D2D key request message includes the ID of UE1 100 as a primary UE, that is, UE1 ID, the ID of UE2 110 as a secondary UE, that is, UE2 ID, and key-idx. Herein, UE2 ID is selectively included in the D2D key request message. That is, only when it is necessary to determine whether UE2 210 has been authorized and/or when UE2 ID is used in generating a security key, UE2 ID is selectively included in the D2D key request message.

The HSS/ProSe server 230 transmits a D2D key response message for the D2D key request message received in operation 223 to the MME 220 (operation 225). The D2D key response message includes a connection-specific security key.

The MME 220 transmits a D2D key response message for the D2D key request message received in operation 219 to UE1 200 (operation 227). The D2D key response message includes the connection-specific security key. NAS security is applied to the D2D key response message.

UE1 200 stores the connection-specific security key received in operation 227 (operation 229) and transmits a page or key response ACK message in response to the page or key response message received in operation 217 to UE2 210 (operation 231).

The connection-specific security key is generated using the secret key of UE1 200, the RAND function, and the connection count of UE1 200. In an alternate embodiment, the ID of UE2, UE2 ID may also be used additionally in generation of connection-specific security key. In an another alternate embodiment, the ID of UE2, UE2 ID and the ID of UE1, UE 1 ID both may also be used additionally in generation of connection-specific security key.

The secret key of UE1 200 is known only to UE1 200 and the HSS/ProSe server 230. The secret key of a specific UE is not provided to another UE and a key derived from the secret key is not transmitted wirelessly.

FIGS. 3a and 3b are diagrams illustrating a signal flow for an example of generating security keys and exchanging the security keys between UEs in a D2D communication system according to a second method of the present disclosure.

Referring to FIGS. 3a and 3b, the D2D communication system includes UE1 300, UE2 310, an MME 320, and a server, for example, an HSS/ProSe server 330.

UE1 300 transmits a page or key request message to UE2 310 (operation 301). The page or key request message includes an ID of UE1 300, UE1 ID.

UE2 310 transmits a D2D key request message to the MME 320 (operation 303). The D2D key request message includes the ID of UE1 300 as a primary UE, that is, UE1 ID and an ID of UE2 310 as a secondary UE, that is, UE2 ID. Herein, UE2 ID is selectively included in the D2D key request message. That is, only when it is necessary to determine whether UE2 310 has been authorized and/or when UE2 ID is used in generating a security key, UE2 ID is included in the D2D key request message. NAS security is applied to the D2D key request message.

The MME 320 authenticates/validates whether the D2D key request message received in operation 303 has been transmitted by an authorized UE (operation 305) and transmits a D2D key request message to the HSS/ProSe server 330 (operation 307) if the authentication/validation is successful. The D2D key request message includes the ID of UE1 300 as a primary UE, that is, UE1 ID and the ID of UE2 310 as a secondary UE, that is, UE2 ID. Herein, UE2 ID is selectively included in the D2D key request message. That is, only when it is necessary to determine whether UE2 310 has been authorized and/or when UE2 ID is used in generating a security key, UE2 ID is included in the D2D key request message.

The HSS/ProSe server 330 derives a connection-specific security key using a secret key of UE1 300 (operation 309) and transmits a D2D key response message for the D2D key request message received in operation 307 to the MME 320 (operation 311). In FIGS. 3*a* and 3*b*, the connection-specific security key derived from the secret key of UE1 is referred to as a first connection-specific security key (connection-specific security key 1). The D2D key response message includes connection-specific security key 1 and security parameters (i.e. RAND, Connection counter and MAC).

The MME 320 transmits a D2D key response message for the D2D key request message received in operation 303 to UE2 310 (operation 313). The D2D key response message includes connection-specific security key 1 and the security parameters. NAS security is applied to the D2D key response message.

UE2 310 stores connection-specific security key 1 received in operation 313 (operation 315). Then UE2 310 transmits a page or key response message for the page or key request message received in operation 301 to UE1 300 (operation 317). The page or key response message includes the security parameters and UE2 ID. UE2 ID is selectively included in the page or key response message. That is, when UE2 ID is used in generating a security key and is not available to UE1 300, UE2 ID is included in the page or key response message. UE1 300 may indicate whether UE2 ID is known to UE1 300 by a key request message.

UE1 300 authenticates the page or key response message received in operation 317 (operation 319) and derives connection-specific security key 1 (operation 321) using the security parameters (i.e. connection counter, RAND) included in the authenticated page or key response message and the secret key of UE1 300.

The connection-specific security key and the MAC are generated using the secret key of UE1 300, the RAND function, and the connection count of UE1 300. In an alternate embodiment, the ID of UE2, UE2 ID may also be used additionally in generation of connection-specific security key. In an another alternate embodiment, the ID of UE2, UE2 ID and the ID of UE1, UE 1 ID both may also be used additionally in generation of connection-specific security key.

UE1 300 transmits a D2D key request message to the MME 320 (operation 323). The D2D key request message includes the ID of UE2 as a primary UE, UE2 ID and the ID of UE1 as a secondary UE, UE1 ID. Herein, UE1 ID is selectively included in the D2D key request message. That is, only when it is necessary to determine whether UE1 has been authorized and/or when UE1 ID is used in generating a security key, UE1 ID is included in the D2D key request message. NAS security is applied to the D2D key request message.

The MME 320 authenticates/validates whether the D2D key request message has been transmitted by an authorized UE (operation 325) and transmits a D2D key request message to the HSS/ProSe server 330 (operation 327). The D2D key request message includes the ID of UE2 310 as a primary UE, UE2 ID and the ID of UE1 300 as a secondary UE, UE1 ID. Herein, UE1 ID is selectively included in the D2D key request message. That is, only when it is necessary to determine whether UE1 has been authorized and/or when UE1 ID is used in generating a security key, UE1 ID is included in the D2D key request message.

The HSS/ProSe server 330 derives a connection-specific security key using a secret key of UE2 (operation 329) and transmits a D2D key response message for the D2D key request message received in operation 327 to the MME 320 (operation 331). In FIGS. 3*a* and 3*b*, the connection-specific security key derived from the secret key of UE2 is referred to as a second connection-specific security key (connection-specific security key 2). The D2D key response message includes connection-specific security key 2 and security parameters (i.e. RAND and Connection counter).

The MME 320 transmits a D2D key response message for the D2D key request message received in operation 323 to UE1 300 (operation 333). The D2D key response message includes connection-specific security key 2 and the security parameters. NAS security is applied to the D2D key response message.

UE1 300 authenticates the D2D key response message received in operation 333 (operation 335) and stores connection-specific security key 2 included in the D2D key response message (operation 337). Then UE1 300 transmits a key response ACK message for the key response message received in operation 317 to UE2 310 (operation 339). The key response ACK message includes the security parameters.

UE2 310 derives connection-specific security key 2 and communicates with UE1 300 using connection-specific security key 2 (operation 343). That is, connection-specific security key 1 is used for communication directed from UE1 300 to UE2 310 and connection-specific security key 2 is used for communication directed from UE2 310 to UE1 300.

Particularly, connection-specific security key 1 and a MAC at operation 309 are generated using the secret key of UE1 300, the RAND function, and the connection count of UE1 300. Connection-specific security key 1 is generated, selectively taking into account the ID of UE2, UE2 ID.

Connection-specific security key 2 is generated using the secret key of UE2 310, the RAND function, and the connection count of UE2 310 at operation 329. In an alternate embodiment, the ID of UE2, UE2 ID may also be used additionally in generation of connection-specific security key. In an another alternate embodiment, the ID of UE2, UE2 ID and the ID of UE1, UE 1 ID both may also be used additionally in generation of connection-specific security key.

The secret keys of UE1 300 and UE2 310 are known only to UE1 300 and the HSS/ProSe server 330. The secret key of a specific UE is not provided to another UE and a key derived from the secret key is not transmitted wirelessly.

FIGS. 4*a* and 4*b* are diagrams illustrating a signal flow for another example of generating security keys and exchanging the security keys between UEs in a D2D communication system according to the second method of the present disclosure.

Compared to the third method, the proposed fourth method may reduce the overhead of a page response message.

Referring to FIGS. 4a and 4b, the D2D communication system includes UE1 400, UE2 410, an MME 420, and a server, for example, an HSS/ProSe server 430.

UE1 400 transmits a page or key request message to UE2 410 (operation 401). The page or key request message includes an ID of UE1 400, UE1 ID.

UE2 410 transmits a D2D key request message to the MME 420 (operation 403). The D2D key request message includes the ID of UE1 400, UE1 ID and an ID of UE2 410, UE2 ID. NAS security is applied to the D2D key request message.

The MME 420 authenticates whether the D2D key request message received in operation 403 has been transmitted by an authorized UE (operation 405) and transmits a D2D key request message to the HSS/ProSe server 430 (operation 407). The D2D key request message includes UE1 ID and UE2 ID.

The HSS/ProSe server 430 derives security key 1 using a secret key of UE1 (operation 409) and derives security key 2 using a secret key of UE2 (operation 411).

The HSS/ProSe server 430 transmits a D2D key response message for the D2D key request message received in operation 407 to the MME 420 (operation 413). The D2D key response message includes security key 1, key-idx-UE1, security key 2, and key-idx-UE2.

The MME 420 transmits a D2D key response message for the D2D key request message received in operation 403 to UE2 410 (operation 415). The D2D key response message includes security key 1, key-idx-UE1, security key 2, and key-idx-UE2. Herein, key-idx-UE1 is a key index for UE1 400 and key-idx-UE2 is a key index for UE2 410. NAS security is applied to the D2D key response message.

UE2 410 stores security key 1 and security key 2 received in operation 415 (operation 417). Then UE2 410 transmits a page or key response message for the page or key request message received in operation 401 to UE1 400 (operation 419). The page or key response message includes key-idx-UE1, key-idx-UE2, and UE2 ID. UE2 ID is selectively included in the page or key response message. That is, when UE2 ID is used in generating a security key and is not available to UE1 400, UE2 ID is included in the page or key response message. UE1 400 may indicate whether UE2 ID is known to UE1 400 by a key request message at operation 401.

UE1 400 transmits a D2D key request message to the MME 420 (operation 421). The D2D key request message includes UE1 ID, key-idx-UE1, UE2 ID, and key-idx-UE2. NAS security is applied to the D2D key request message.

The MME 420 authenticates whether the D2D key request message received in operation 421 has been transmitted by an authorized UE (operation 423) and transmits a D2D key request message to the HSS/ProSe server 430 (operation 425). The D2D key request message includes UE1 ID, key-idx-UE1, UE2 ID, and key-idx-UE2.

The HSS/ProSe server 430 transmits a D2D key response message for the D2D key request message received in operation 425 to the MME 420 (operation 427). The D2D key response message includes security key 1 and security key 2.

The MME 420 transmits a D2D key response message for the D2D key request message received in operation 421 to UE1 400 (operation 429). The D2D key response message includes security key 1 and security key 2. NAS security is applied to the D2D key response message.

UE1 400 stores security key 1 and security key 2 received in operation 429 (operation 431). Then UE1 400 and UE2 410 communicate using security key 1 and security key 2 (operation 433). That is, security key 1 is used for communication directed from UE1 400 to UE2 410 and security key 2 is used for communication directed from UE2 410 to UE1 400.

FIGS. 5a and 5b are diagrams illustrating a signal flow for an example of generating security keys and exchanging the security keys between UEs in a D2D communication system according to a third method of the present disclosure.

Referring to FIGS. 5a and 5b, the D2D communication system includes UE1 500, UE2 510, and an MME 520.

UE1 500 generates security key 1 for a connection to UE2 510 (operation 501) and transmits a D2D key information message to the MME 520 (operation 503).

The D2D key information message includes UE1 ID, security key 1, and key-idx-UE1. NAS security is applied to the D2D key information message.

The MME 520 authenticates the D2D key information message and stores related information, that is, the information included in the D2D key information message (operation 505). The MME 520 transmits a D2D key information ACK message for the D2D key information message received in operation 503 to UE1 500 (operation 507). NAS security is applied to the D2D key information ACK message.

UE1 500 transmits a D2D key request message to UE2 510 (operation 509). The D2D key request message includes UE1 ID and key-idx-UE1.

UE2 510 generates security key 2 for a connection to UE1 500 (operation 511) and transmits a D2D key information message to the MME 520 (operation 513). The D2D key information message includes UE2 ID, security key 2, and key-idx-UE2. NAS security is applied to the D2D key information message.

The MME 520 transmits a D2D key information ACK message for the D2D key information message received in operation 513 to UE2 510 (operation 515). The MME 520 authenticates the D2D key information message and stores related information, that is, the information included the D2D key information message (operation 517). NAS security is applied to the D2D key information ACK message.

UE2 510 transmits a D2D key request message to the MME 520 (operation 519). The D2D key request message includes UE1 ID and key-idx-UE1.

In network multiple MMEs may be there. UE1 may be associated with MME1 and UE2 may be associated with MME2.

In this case, MME of UE2 sends the key request message with UE1 ID and key-idx-UE1 to MME of UE1 and gets the security KEY 1. MME of UE 2 can determine whether the MME of UE1 is different based on UE1 ID or alternately the MME ID of MME of UE1 can be received by UE2 at operation 509 and received by MME of UE2 at operation 519. If the MME of UE1 500 is different, the MME 520 sends a request to the MME of UE1 500 (operation 521).

The MME 520 transmits a D2D key response message for the D2D key request message received in operation 519 to UE2 510 (operation 523). The D2D key response message includes security key 1 and NAS security is applied to the D2D key response message.

UE2 510 stores security key 1 included in the D2D key response message (operation 525) and transmits a D2D key response message to UE1 500 (operation 527). The D2D key response message includes UE2 ID and key-idx-UE2.

UE1 500 transmits a D2D key request message to the MME 520 (operation 529). The D2D key request message includes UE2 ID and key-idx-UE2 received from UE2 510 in operation 527. NAS security is applied to the D2D key request message.

If the MME of UE2 510 is different, the MME 520 requests to the MME of UE2 510 (operation 531).

The MME 520 transmits a D2D key response message for the D2D key request message received in operation 529 to UE1 500 (operation 523). The D2D key response message includes Security Key 2. NAS security is applied to the D2D key response message.

UE1 500 stores security key 2 (operation 535).

FIG. 6 is a diagram illustrating a signal flow for another example of generating security keys and exchanging the security keys between UEs in a D2D communication system according to the third method of the present disclosure.

Referring to FIG. 6, the D2D communication system includes UE1 600, UE2 610, and an MME 620.

UE1 600 generates security key 1 for a connection to UE2 610 (operation 601) and transmits a service request message to the MME 620 (operation 603). The service request message includes UE1 ID and security key 1, and additionally, UE2 ID or a discovery code. FIG. 6 will be described on the assumption that the service request message includes a discovery code. NAS security is applied to the service request message.

The MME 620 authenticates the service request message and stores related information, that is, the information included in the service request message (operation 605). The MME 620 determines UE2 ID from the discovery code, determining that the service request message does not include UE2 ID (operation 607). If the service request message includes UE2 ID, step 607 may be omitted. Then, the MME 620 transmits a page message to UE2 610 (operation 609). The page message includes information indicating direct connection and UE1 ID.

UE2 610 generates security key 2 for a connection to UE1 600 (operation 611) and transmits a service request message to the MME 620 (operation 613). The service request message includes UE2 ID and security key 2, and additionally, UE1 ID or a discovery code. NAS security is applied to the service request message.

The MME 620 transmits a service response message for the service request message received in operation 613 to UE2 610 (operation 615). The service response message includes security key 1. NAS security is applied to the service response message.

UE2 610 stores security key 1 included in the service response message received in operation 615 (operation 617).

Then, the MME 610 transmits a service response message for the service request message received in operation 603 to UE1 600 (operation 619). The service response message includes security key 2.

UE1 600 stores security key 2 included in the service response message received in operation 619 (operation 621).

FIG. 7 is a block diagram of a UE that manages a security key in a D2D communication system according to an embodiment of the present disclosure.

Referring to FIG. 7, a UE 700 includes a receiver 702, a controller 704, and a transmitter 706.

The controller 704 provides overall control to the UE 700. Particularly, the controller 704 controls overall operations related to management of a security key according to an embodiment of the present disclosure. The overall operations related to management of a security key have been described before with reference to FIGS. 1 to 6 and thus their description is not provided herein.

The receiver 702 and the transmitter 706 receive and transmit messages under the control of the controller 704. The messages have been described before with reference to FIGS. 1 to 6 and their detailed description is not provided herein.

FIG. 8 is a block diagram of an MME that manages a security key in a D2D communication system according to an embodiment of the present disclosure.

Referring to FIG. 8, an MME 800 includes a receiver 802, a controller 804, and a transmitter 806.

The controller 804 provides overall control to the MME 800. Particularly, the controller 804 controls overall operations related to management of a security key according to an embodiment of the present disclosure. The overall operations related to management of a security key have been described before with reference to FIGS. 1 to 6 and thus their description is not provided herein.

The receiver 802 and the transmitter 806 receive and transmit messages under the control of the controller 804. The messages have been described before with reference to FIGS. 1 to 6 and their detailed description is not provided herein.

FIG. 9 is a block diagram of a server that manages a security key in a D2D communication system according to an embodiment of the present disclosure.

Referring to FIG. 9, a server 900 includes a receiver 902, a controller 904, and a transmitter 906.

The controller 904 provides overall control to the server 900. Particularly, the controller 904 controls overall operations related to management of a security key according to an embodiment of the present disclosure. The overall operations related to management of a security key have been described before with reference to FIGS. 1 to 4B and thus their description is not provided herein.

The receiver 902 and the transmitter 906 receive and transmit messages under the control of the controller 804. The messages have been described before with reference to FIGS. 1 to 4B and their detailed description is not provided herein.

Although the disclosure has been described with reference to the preferred embodiments, those skilled in the art will appreciate that various modifications and variations can be made in the present disclosure without departing from the spirit or scope of the disclosure described in the appended claims. Accordingly, the scope of the disclosure should be determined by the appended claims and their legal equivalents, not by the specific embodiments described herein.

It will be appreciated that the method and apparatus for managing a security key according to the embodiments of the present disclosure may be implemented in the form of hardware, software, or a combination of hardware and software. Any such software may be stored in a volatile or non-volatile storage device such as a Read-Only Memory (ROM), or in a memory such as a Random Access Memory (RAM), a memory chip, a memory device or a memory integrated circuit, or in a storage medium, such as a Compact Disc (CD), a Digital Versatile Disc (DVD), a magnetic disk or a magnetic tape, which is optically or magnetically recordable and simultaneously, is readable by a machine, regardless of whether the software can be deleted or rewritten. It will be appreciated that a memory is an example of a storage medium readable by a machine (for example, a computer) suitable for storing a program or programs including instructions for implementing the embodiments of the present disclosure.

Accordingly, the present disclosure includes a program including a code for implementing a method claimed in any claim of this specification, and a machine-readable storage medium for storing this program. Also, this program may be electronically conveyed via any medium such as a communication signal transmitted through a wired or wireless connection, and the present disclosure suitably includes equivalents of this program.

In the embodiments of the present disclosure, the program may be received from the apparatus for managing a security key and stored. The program providing apparatus may include a memory for storing a program including instructions that make a graphic processing device to perform a predetermined content protection method and information required for the content protection method, a communication unit for conducting wired or wireless communicating with the graphic processing device, and a controller for transmitting the program to the transmission and reception device automatically or upon request of the graphic processing device.

The invention claimed is:

1. A method for managing a security key by a first user equipment (UE) in a communication system, the method comprising;
transmitting, to a server, a first key request message including an identifier (ID) of the first UE through a mobility management entity (MME);
receiving, from the server, a key response message including security parameters;
determining a security key based on the security parameters and a secret key of the first UE; and
communicating with a second UE based on the security key while a connection between the first UE and the second UE is maintained.

2. The method of claim 1, wherein the MME receives, from the second UE, a second key request message including the ID of the first UE and if the second UE is authorized, transmits the second key request message to the server.

3. The method of claim 1, wherein the security parameters include at least one of a RAND function, a connection count, or a medium access control (MAC) address.

4. The method of claim 2, wherein, if the second UE needs to be authorized and an ID of the second UE is used in generating the security key, the second key request message includes an ID of the second UE.

5. The method of claim 1, wherein, if an ID of the second UE is used in generating the security key, unavailable to the first UE, the key response message includes an ID of the second UE.

6. The method of claim 2, further comprising:
receiving a first response message including a key index and the security key received from the server;
transmitting, to the server, a third key request message including the ID of the first UE and the key index through the MME; and
receiving, from the server, a second response message including the security key.

7. The method of claim 6, wherein, if the second UE is authorized, the MME transmits the third key request message to the server.

8. A method for managing a security key by a second user equipment (UE) in a communication system, the method comprising;
transmitting, to a server, a key request message including an identifier (ID) of a first UE;
receiving, from the server, a first key response message including security parameters and a security key, the security key being derived based on a secret key of the first UE;
transmitting, to the first UE, a second key response message including the security parameters; and
communicating with the first UE based on the security key while a connection between the first UE and the second UE is maintained.

9. The method of claim 8, wherein, if the second UE is authorized, a mobile management entity (MME) transmits the key request message to the server.

10. The method of claim 8, wherein the security parameters include at least one of a RAND function, a connection count, or a medium access control (MAC) address.

11. The method of claim 8, wherein, if the second UE needs to be authorized and an ID of the second UE is used in generating the security key, the key request message includes an ID of the second UE.

12. The method of claim 8, wherein, if an ID of the second UE is used in generating the security key, unavailable to the first UE, the second key response message includes an ID of the second UE.

13. The method of claim 8, wherein, if the key request message includes a key index, the method further comprising:
receiving, from the server, a third key response message including a key index and the security key; and
transmitting, to the first UE, a fourth key response message including the key index.

14. A first user equipment (UE) for managing a security key in a communication system, the first UE comprising;
a transceiver configured to transmit and receive messages; and
a controller operably connected to the transceiver, the controller configured to:
transmit, to a server, a first key request message including an identifier (ID) of the first UE through a mobility management entity (MME);
receive, from the server, a key response message including security parameters;
determine a security key based on the security parameters and a secret key of the first UE; and
communicate with a second UE based on the security key while a connection between the first UE and the second UE is maintained.

15. The first UE of claim 14, wherein the MME receives, from the second UE, a second key request message including the ID of the first UE and if the second UE is authorized, transmits the second key request message to the server.

16. The first UE of claim 14, wherein the security parameters include at least one of a RAND function, a connection count, or a medium access control (MAC) address.

17. The first UE of claim 15, wherein, if the second UE needs to be authorized and an ID of the second UE is used in generating the security key, the second key request message includes an ID of the second UE.

18. The first UE of claim 14, wherein, if an ID of the second UE is used in generating the security key, unavailable to the first UE, the key response message includes an ID of the second UE.

19. The first UE of claim 15, wherein:
the controller is further configured to:
receive a first response message including a key index and the security key received from the server;
transmit, to the server, a third key request message including the ID of the first UE and the key index through the MME; and
receive, from the server, a second response message including the security key.

20. The first UE of claim 19, wherein, if the second UE is authorized, the MME transmits the third key request message to the server.

\* \* \* \* \*